United States Patent Office 2,735,691
Patented Feb. 21, 1956

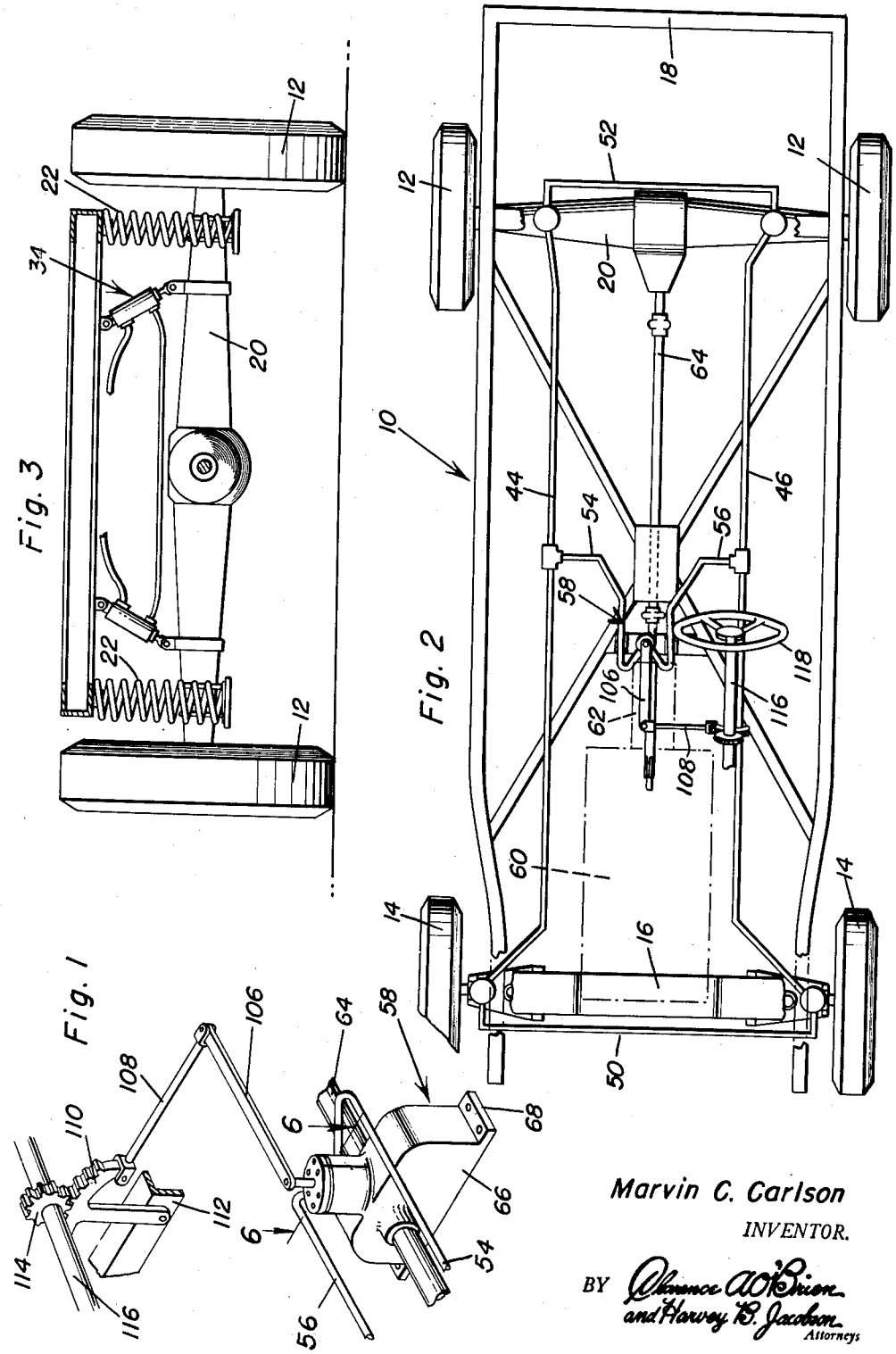

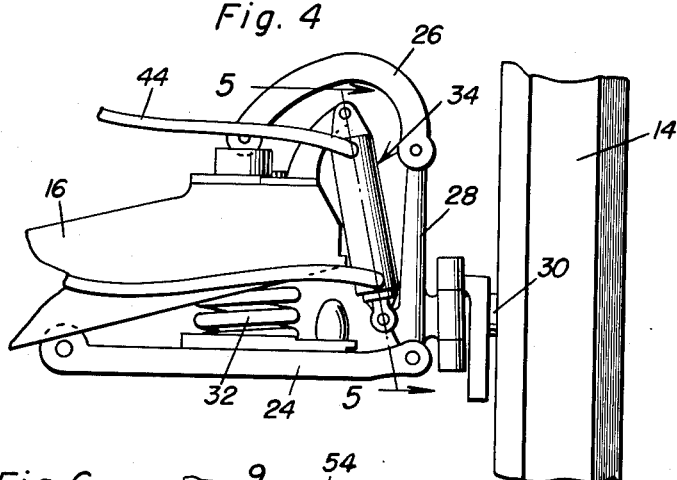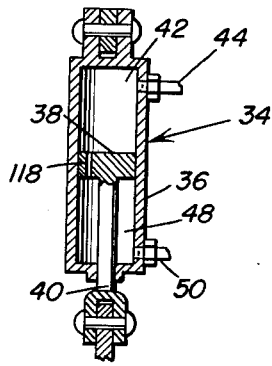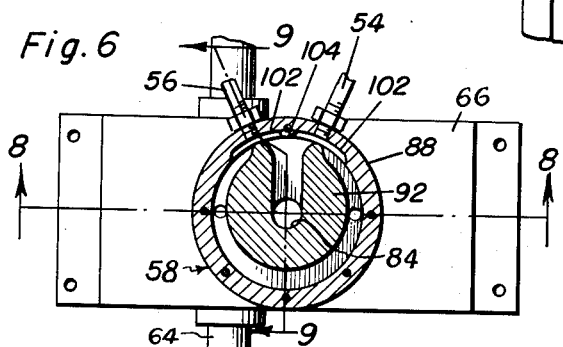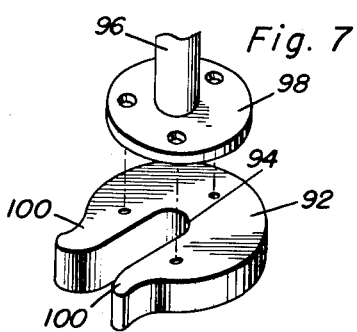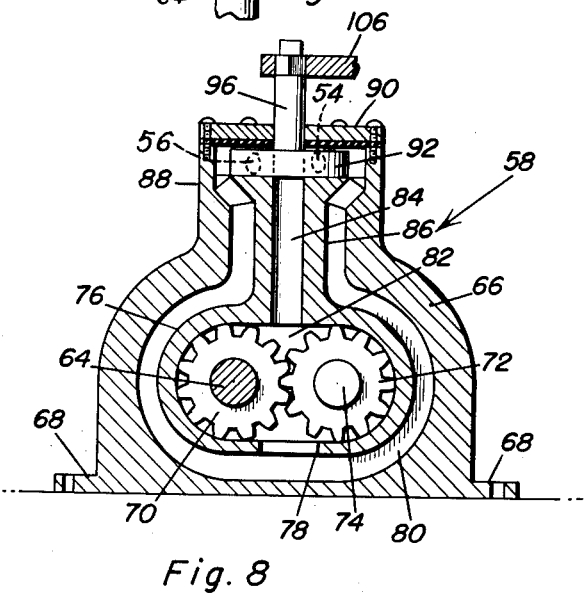
Marvin C. Carlson
INVENTOR.

2,735,691
STEERING CONTROLLED VEHICLE STABILIZING SYSTEM

Marvin C. Carlson, Valparaiso, Ind.

Application October 8, 1953, Serial No. 384,927

2 Claims. (Cl. 280—112)

This invention relates generally to improvements for stabilizing systems adapted for use particularly in automotive vehicles.

A primary object of this invention is to provide improvements in stabilizing systems for motor vehicles in which a simplified arrangement of conduit means is embodied which, taken in conjunction with an improved and novel pump mechanism, permits a single conduit to operate both as an outlet and a return to the operating pump.

Another object of this invention is to provide an improved stabilizing system for motor vehicles having steerable wheels wherein the control mechanism for selectively establishing the relationship of outlet or return to the conduit is operated in conjunction with the steering mechanism of the vehicle such that a greater or lesser stabilizing effect is accomplished in accordance with the amount of steering movement imparted to the wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the general arrangement and relationship of parts in the pump and control mechanism therefor;

Figure 2 is a top plan view of a motor vehicle chassis having the novel system mounted thereon;

Figure 3 is a transverse sectional view showing the positioning of the fluid motors associated with each of the vehicle wheels;

Figure 4 is an elevational view showing a portion of the vehicle and showing the relationship of the fluid motor with respect to one of the steerable wheels thereof;

Figure 5 is a vertical section taken through one of the fluid motors;

Figure 6 is a horizontal section taken substantially along the section line 6—6 in Figure 1;

Figure 7 is an exploded perspective view of the valve plate and associated mechanism for imparting rotation thereto;

Figure 8 is a vertical section taken through the pump assembly, taken substantially along the plane of section line 8—8 in Figure 6; and Figure 9 is a transverse vertical section taken substantially along the plane of section line 9—9 in Figure 6.

Referring now more particularly to the drawings, reference numeral 10 indicates the vehicle frame generally, while reference numeral 12 is utilized to designate the rear driving wheels thereof and the reference numeral 14 is utilized to indicate the front steerable wheels thereof, although it is to be understood that this particular arrangement of driving and steering wheels is not necessary for proper operation of the hereinafter described stabilizing system. Reference numeral 16 indicates the front cross-member of the vehicle while reference numeral 18 indicates the rear cross-member thereof, and it will be noted that the driving wheels have associated therewith the conventional axle housing assembly 20 which are, in this instance, suitably connected to the vehicle frame by means of the resilient coil springs 22, it being of course understood that other suitable mechanism, such as track bars, may be necessary to impart the necessary lateral and longitudinal stability to the wheels. As seen most clearly in Figure 4, each of the steerable wheels 14 has associated therewith a lower control arm member 24 and also an upper control arm member 26 which carry at their outer ends the steering knuckle 28 to which the wheel spindle 30 is pivotally connected for permitting the proper steering motion of these wheels, all in a conventional manner. Further, a coil spring 32 is disposed between the cross frame member 16 and the lower control arm 24 as is also conventional.

As shown in Figures 3 and 4, fluid motor assemblies 34 are interconnected between the vehicle frame and each of the associated wheels in such a manner as to act both as shock absorbers and as stabilizing means, as hereinafter described. The construction of one of these fluid motors is shown in Figure 5, and it will be noted that this construction embodies a cylindrical casing 36 having a piston member 38 reciprocable therein which employs a connecting rod 40 guidably received in the lower end and projecting from the cylinder 36. The free end of the connecting rod is bifurcated or provided with other means for suitably connecting this member to either the axle housing 20, in the manner shown in Figure 3, or the steering knuckle 28, as shown in Figure 4. The upper end of the cylinder 36 is also provided with suitable means for connection to the vehicle frame, as for example in the manner shown in either Figures 3 or 4.

The upper chamber 42 within each assembly is provided with an outlet to which a conduit 44 or 46 is connected, it being noted that the fluid motors at one side of the vehicle frame are interconnected by either one of these conduits. The lower chamber 48 within the fluid motor assembly is provided also with an outlet to which one of the conduits 50 or 52 is connected.

It will be noted that these conduits 50 and 52 interconnect these fluid motors at opposite ends of the frame for a purpose presently apparent. Each of the individual conduits 44 and 46 are, in turn, provided with T-fittings or other suitable means for connection to further conduits 54 and 56 which communicate with the pump assembly which is indicated generally by the reference character 58. As will be presently apparent, the operation of the system is such that manipulation of the steering wheel of the vehicle will effect a pump valve control assembly such that one or the other of the conduits 54 or 56 will be connected to the pump outlet to prevent heeling over of the vehicle frame in the direction opposite to the direction of turn of the vehicle, that is, the system tends to stabilize the vehicle frame with respect to its wheels such as to prevent roll-over of the vehicle.

As seen most clearly in Figure 2, the vehicle employs the usual engine, as indicated diagrammatically by the reference character 60, which has associated therewith the usual transmission 62 and the vehicle also employs a conventional drive shaft assembly 64 for connection to the differential mechanism in the driving assembly. The pump 58 embodies an outer housing or casing 66 which is provided with suitable mounting ears 68 for connection to the vehicle frame and the drive shaft 64 is journaled within this casing and has suitably secured thereon a gear member 70 which meshes with an idler gear 72 suitably journaled, as by shaft 74 in the casing, and it will be noted that these two gears are partially encompassed by the inner casing or shroud 76. The bottom of the inner casing is open as at 78 to provide an inlet communicating with the gears 70 and 72 whereby upon rotation of these gears, fluid contained within the inlet passages 80 between the inner and outer casings 66 and 76 will be trapped between the gear teeth and the inner surface of the shroud 76 and carried therearound by rotation of the gears into the upper or pressure chamber 82 and outwardly thereof through the discharge passage 84 which extends vertically upwardly through the neck 86 of the inner casing in the manner shown. The outer housing is provided with a corresponding vertical upper neck 88 having a removable cover 90 in the manner shown. A generally C-shaped valve plate 92 is disposed on the upper surface of the neck 86 and the central radial slot 94 thereof is in communication with the upper end of the discharge passage 84, and it will be noted that the shaft 96 journaled in the cover 90 is in register with the passage 84 such that the valve plate is always in communication with this discharge passage, the lower end of the shaft 96 embodying a flange 98 secured to the valve plate 92 in the manner shown. The radial slot 94 in the valve plate presents the bifurcated leg members 100 which also project radially beyond the generally circular main body portion of the plate, and, as seen most clearly in Figure 6, the inner surface of the neck 88 of the outer casing is generally cylindrical throughout a substantial portion of its length, but is provided with recesses 102 in the region where the conduits 54 and 56 connect therewith. A vertical ridge 104 separates these two recesses 102 and it will be manifest that as the valve plate 92 is turned in one or the other direction, the discharge passage between its legs defined by the slot 94 will progressively communicate with one or the other of the conduit openings 54 or 56 while simultaneously tending to block out the other such that movement of the valve plates from the position shown in Figure 6 in one direction or another will build up a more positive pressure in one or the other of the conduits 54 or 56. Of course, when the free ends of the legs 100 are in register respectively with the cylindrical inner surface of the neck 88 and with the ridge or rib 104, one or the other of the conduits 54 or 56 will be completely and fully communicated with the discharge of the pump while the other will be completely blocked therefrom and will communicate only with the return of the pump. Normally, in the position shown in Figure 6, the pressure is equalized and by-pass is accomplished in the manner indicated by the arrow.

The previously mentioned shaft 96 is securely fastened to one end of a lever 106 whose other end is connected to a drag link member 108 pivotally secured to the sector 110 which is, in turn, pivotally secured at its lower end to a portion of the vehicle frame, as indicated by the reference character 112. The teeth of the sector 110 are in mesh with a pinion gear 114 carried by the securing shaft 116 with which a conventional steering wheel 118 is associated. In this manner, it will be clear that rotation of the steering wheel and consequently of the shaft 116 will effect rotation of the gear 114 and consequently pivotal movement of the sector 110 such as to rotate the valve plate 92 in one direction or another in accordance with the correspondig motion of the steering wheel. For example, when the steering wheel is rotated in a direction to turn the vehicle to the left, the valve plate 92 will be rotated such that the conduit 54 will have the greater pressure from the fluid pump imparted thereto so as to prevent or tend to prevent roll or heeling over of the vehicle frame in a clockwise direction about its longitudinal axis, looking from rear to front of the vehicle. Some of the fluid pumped to the fluid motors at the right hand side of the vehicle frame in this instance will pass through metering orifices 118 provided in each of the pistons 38, and consequently, fluid will be forced into the lower of the chambers 48 out through one of the corresponding conduits 50 or 52 and into the lower chamber of the corresponding fluid motor at the opposite side of the frame such that a dual stabilizing effect is obtained inasmuch as a greater pressure will exist in the lower of the chambers in the fluid motors at the opposite side of the frame, tending to prevent lifting of the frame with respect to the wheels at this side of the vehicle, as will be manifest.

From the foregoing, the construction and operation of the device will be readily understood and further explanation is believed to be unnecessary. However, since numerous modifications and equivalents will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a vehicle having a frame supported by wheels, a source of fluid pressure, a fluid motor associated with each of the vehicle wheels and connected between said frame and its supporting wheels to control vertical movement of the frame, each fluid motor having a piston which divides the motor into two chambers, a first conduit connecting the chambers at corresponding ends of the fluid motors on one side of the vehicle frame with said source, a second conduit connecting the chambers at corresponding ends of the other fluid motors with said source, fluid conductors at each end of said frame interconnecting the chambers of the relatively opposite ends of said motors, and means connected with the steering mechanism of the vehicle for selectively connecting one of said conduits with said source while simultaneously relieving the pressure of the other of said conduits.

2. The combination of claim 1 wherein each of said fluid motor pistons has a metering orifice through which the chambers in the motor accommodating said piston are interconnected.

References Cited in the file of this patent

UNITED STATES PATENTS

| 832,518 | Wolcott | Oct. 2, 1906 |
| 932,333 | Schmelz | Aug. 24, 1909 |
| 1,026,662 | Eisner | May 21, 1912 |
| 2,110,809 | Murphy | Mar. 8, 1938 |
| 2,490,719 | Tank | Dec. 6, 1949 |
| 2,678,830 | Cigan | May 18, 1954 |

FOREIGN PATENTS

| 518,848 | Great Britain | Mar. 18, 1940 |